(12) United States Patent
Voutilainen

(10) Patent No.: US 7,224,737 B2
(45) Date of Patent: May 29, 2007

(54) METHOD AND APPARATUS EMPLOYING PAM-5 CODING WITH CLOCK EMBEDDED IN DATA STREAM AND HAVING A TRANSITION WHEN DATA BITS REMAIN UNCHANGED

(75) Inventor: Martti Voutilainen, Espoo (FI)

(73) Assignee: Nokia Corporation, Espoo (FI)

( * ) Notice: Subject to any disclaimer, the term of this patent is extended or adjusted under 35 U.S.C. 154(b) by 831 days.

(21) Appl. No.: 10/684,169

(22) Filed: Oct. 10, 2003

(65) Prior Publication Data
US 2005/0078712 A1 Apr. 14, 2005

(51) Int. Cl.
H04B 14/04 (2006.01)
H03K 7/02 (2006.01)
(52) U.S. Cl. ...................... 375/242; 332/115
(58) Field of Classification Search ................ 375/242; 332/115
See application file for complete search history.

(56) References Cited

U.S. PATENT DOCUMENTS 6,829,309 B1* 12/2004 Zortea ........................ 375/294
2004/0101060 A1* 5/2004 Simon et al. ................ 375/242

OTHER PUBLICATIONS

Kaliman et al., "Ternary Physical Protocol for MARILAN, a Multiple-Access Ring Local Area Network", IEEE 1988, 0195-623X/88/0000/0014, pp. 14-20.

Svensson et al., "A 3-Level Asynchronous Protocol for a Differential Two-Wire Communication Link", IEEE 1994, 0018-9200/94, pp. 1129-1132.

Guo et al., "Voltage Comparator Circuits for Multiple-Valued CMOS Logic", IEEE Computer Science 2002, Proceedings of the 32$^{nd}$ Intl. Symposium on Multiple-Valued Logic (ISMVL'02), 0195-623X-02, 7 pages.

Han et al., "A Current-Mode Folding/Interpolating CMOS Analog to Quaternary Converter Using Binary to Quaternary Encoding Block", IEEE Computer Science 2002, Proceedings of the 32$^{nd}$ IEEE Intl. Symposium on Multiple-Valued Logic (ISMVL '02), 0195-623X/02, 6 pgs.

Taborek, et al., "Multi-Level Analog Signaling Techniques for 10 Gigabit Ethernet", IEEE 802.3 Tutorial, 86 pgs, 1999.

* cited by examiner

Primary Examiner—Kevin Kim
(74) Attorney, Agent, or Firm—Harrington & Smith, PC

(57) ABSTRACT

To significantly reduce mobile station static power consumption, and to make it possible to use a high speed asynchronous link in the mobile station, the invention uses one of the amplitude levels of, preferably, a PAM-5 (Pulse Amplitude Modulation with five amplitude levels) modulation technique as a strobe signal to generate a change in the transmitted signal. The change in the transmitted signal makes it possible for a PAM-5 receiving circuit to sample and decode two consecutive occurrences of the same data bits. The use of this invention avoids the requirement to include an oscillator in the PAM-5 receiver, or to dedicate a signal line to transmit a clock signal from the transmitter to the receiver.

16 Claims, 8 Drawing Sheets

667 MHz
1.5 GBaud

30 MHz
60 MBaud

| $B_i$ | $B_{i+1}$ | $C_0$ | $C_1$ | $C_2$ | $Q_i$ |
|---|---|---|---|---|---|
| 0 | 0 | 1 | 0 | 0 | 0 |
| 1 | 0 | 0 | 1 | 0 | 1 |
| 0 | 1 | 0 | 0 | 1 | 2 |
| 1 | 1 | 0 | 0 | 0 | 3 |

METHOD AND APPARATUS EMPLOYING PAM-5 CODING WITH CLOCK EMBEDDED IN DATA STREAM AND HAVING A TRANSITION WHEN DATA BITS REMAIN UNCHANGED

TECHNICAL FIELD

This invention relates generally to asynchronous communications links that use multi-level analog signaling and, more specifically, relates to multi-level pulse amplitude modulation (PAM) such as PAM-5 (PAM with five amplitude levels), and even more specifically relates to the use of the PAM-5 technique for communication between logical entities within a mobile communications device, and for communication between the mobile communications device and external circuitry, including accessories.

BACKGROUND

Multi-level analog signaling (MAS) is used in Ethernet (10 Gigabit Ethernet) and other applications. Various MAS techniques include T-Waves, Quadrature Amplitude Modulation (QAM) and, of most interest to this invention, PAM, in particular PAM-5. In general, transmitting different amplitude levels over a serial asynchronous link can be used to reduce electromagnetic interference and other problems, and is a well known technique.

If an oscillator is required at the receiver for data recovery, then the ability to reduce receiver power consumption during idle periods (static power consumption) is compromised, as the oscillator will typically remain powered on at least for some part of the idle period. If powered down or off, then some finite amount of time is required to re-power and settle the oscillator circuitry when the idle period ends (i.e., when data reception begins again). Further, and depending on the architecture of the system, there may be a plurality of instances of the receiver circuitry, each requiring its own associated oscillator. As may be appreciated, in many applications it is desirable to minimize power consumption, circuit complexity and cost. While the clock signal could be transmitted through a separate line from the transmitter to the receiver, this technique also adds cost and complexity to the system. For example, 4-level logic (with a separate clock line) is used in, for example, RAMBUS memory systems, with an option to use only the two middle amplitude levels.

A publication of interest to the teachings of this invention is IEEE Journal of Solid State Circuits, Vol 29, No 9, September 1994: Crister Svensson and Jiren Yuan, "A 3-Level Asynchronous Protocol for a Differential Two-Wire Communication Link". This publication describes a technique that uses multi-level amplitude signaling in such a way that there is no need to provide an oscillator at the receiver. In the 3-level signaling method of Svensson et al. the symbol 0 is represented by a change from state S(i) to S(I+1), and the symbol 1 is represented by a change from state S(i) to S(I−1).

Another publication of interest to this invention is "Ternary Physical Protocol for Marilan, A Multiple-Access Ring Local Area Network", R. J. Kaliman et al., Electrical Engineering Dept., Univ. of Maryland, College Park, Md., pp. 14-20, 1988. FIGS. 4(a) and 4(b) show symbol encoding examples for an exemplary binary sequence and a ternary non-return to zero (NRZ) representation thereof, respectively. In the approach of Kaliman et al. the ring local area network physical layer uses the ternary NRZ code that is suitable for asynchronous transmission, and the code symbols assume values in the balanced ternary set $\{-1,0,1\}$. To detect a clock signal, a transition must occur at the end of every bit period and, consequently, two consecutive channel symbols must take different ternary values (as shown in FIGS. 4(a) and 4(b) for the repeats of the binary 1 and binary zero bits).

Neither of the foregoing publications operates with more than three amplitude levels and, hence, they are limited on the amount of data that can be encoded by a symbol and thus the maximum data rate that can be sustained between a transmitter and a receiver.

SUMMARY OF THE PREFERRED EMBODIMENTS

The foregoing and other problems are overcome, and other advantages are realized, in accordance with the presently preferred embodiments of these teachings.

In order to significantly reduce static power consumption, and to make it possible to use a high speed asynchronous link in a mobile station, this invention uses one of the amplitude levels of the MAS signal as a strobe signal. More specifically, this invention employs one of the five amplitude levels of a PAM-5 (Pulse Amplitude Modulation with five amplitude levels) waveform as a strobe signal to generate a change in the transmitted signal that makes it possible for the receiving circuit to sample and decode two consecutive occurrences of the same data bits. In the method of this invention a separate strobe level is used for clocking, if consecutive symbols would be the same, and thus the method differs significantly from the approach of Svensson et al. Furthermore, through the use of five amplitude level modulation (PAM-5) a given symbol can encode a plurality of data bits, and thus significantly improves on the ring LAN physical layer protocol described by Kaliman et al.

The use of this invention thus enables a MAS receiver oscillator, such as a phase lock loop (PLL), to be avoided, and does so in the context of a receiver of a PAM-5 signal that is constructed without requiring an oscillator for clock regeneration.

In order to provide a scalable bit rate from zero to very high values, multi-amplitude signal levels are generated and transmitted in such a way that the signal waveform amplitude is changed if the same symbol (corresponding to a plurality of data bits) is sent during consecutive transmission periods. While having at least two different amplitude levels for every symbol to be transmitted would create the additional level change, in the preferred embodiment one additional strobe level is defined for use in creating the change in amplitude to inform the receiver that the current symbol is the same as the previous symbol. Any number of strobe signals alternating with the correct data level can be sent in succession for indicating a run of identical data bits. In this manner the need for a receiver data recovery oscillator is avoided, enabling essentially zero idle power consumption to be achieved, and the level change can be used to sample every received symbol. The ability to achieve essentially zero idle power is especially important in mobile, battery powered devices, such as (but not limited to) cellular telephones and other types of personal communicators.

In one aspect thereof this invention provides a MAS method, where each transmitted symbol encodes at least two data bits, that includes encoding data bits into symbols represented by multi-level analog signals; and, when the data bits to be encoded are the same as the data bits encoded for an immediately prior symbol, encoding instead a strobe signal represented by a predetermined one of the levels of the multi-level analog signal, where the presence of the strobe signal at a receiver is used to generate clock edges for sampling the received signal. In the preferred embodiment the MAS comprises a PAM-5 signal, where four analog signal levels convey the encoded data bits and one analog signal level conveys the strobe signal. For a case where there are more than two consecutive repeats of the at least two data bits, the method further includes toggling or alternating between outputting a predetermined one of the levels of the multi-level analog signal that represents the corresponding symbol, and the predetermined one of the levels of the multi-level analog signal that represents the strobe signal.

In another aspect thereof this invention provides a mobile station that includes a plurality of sub-assemblies that are coupled together by a plurality of data communication buses connected to ports. At least one port includes a MAS transmitter circuit arrangement where each transmitted symbol encodes at least two data bits. The MAS transmitter circuit arrangement includes an encoder for encoding data bits into symbols represented by multi-level analog signals. The encoder is responsive to a condition where the data bits to be encoded are the same as the data bits encoded for an immediately prior symbol, for encoding instead a strobe signal represented by a predetermined one of the levels of the multi-level analog signal. At least one further port includes a MAS receiver circuit arrangement that includes a decoder and clock recovery circuit for decoding received symbols represented by the multi-level analog signals into data bits. The decoder and clock recovery circuit are responsive to a receipt of the strobe signal for generating sampling clock edge transitions and data bits that are the same as the data bits decoded for an immediately prior received symbol. In the preferred mobile station embodiment the multi-level analog signal is a PAM-5 signal, where four analog signal levels convey the encoded data bits and one analog signal level conveys the strobe signal. For a case where there are more than two consecutive repeats of the at least two data bits, the encoder toggles between outputting a predetermined one of the levels of the multi-level analog signal that represents the corresponding symbol, and the predetermined one of the levels of the multi-level analog signal that represents the strobe signal. In a disclosed embodiment one of the sub-assemblies comprises a cellular engine, and another one of the sub-assemblies comprises a display, while another one of the sub-assemblies may comprise a camera. The cellular engine may be coupled to circuitry external to the mobile station via another port and bus.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

Figure 1:
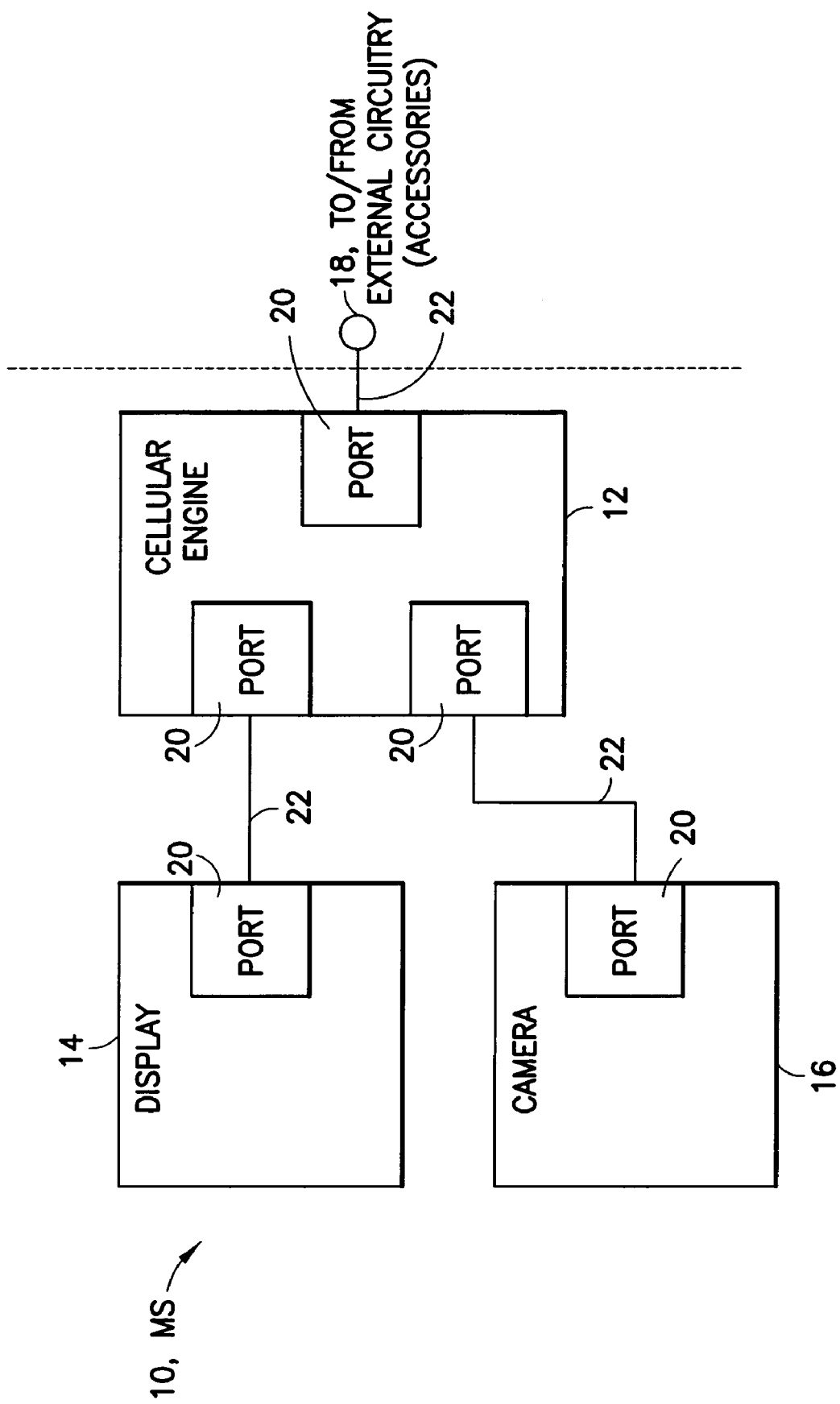
FIG. 1 is a simplified block diagram of a mobile station having sub-assemblies connected by buses via ports.

FIG. 1 is a simplified block diagram of a mobile device or mobile station 10, such as a cellular telephone, having a plurality of sub-assemblies. The sub-assemblies may be, by example, a cellular engine 12, a display 14 and a camera 16 that are connected by buses 22 (implemented with cables or stripline pairs) via ports 20. The cellular engine 20 may also be coupled to external components, such as an accessory or accessories 18, via another port 20 and bus 22.

It should be noted that the embodiment of FIG. 1 is exemplary, in that there may be more than or fewer than the illustrated number and types of sub-assemblies. Furthermore, in another embodiment a hub architecture may be employed, where the ports 20 and buses 22 are arranged into a signal line concentrator such that, as an example, the display 14, camera 16 and cellular engine 12 would each be connected together via a hub sub-assembly (the cellular engine 12 may in this case have only one port 20 for connection to the hub, instead of the three ports 20 illustrated in FIG. 1).

In the preferred embodiment the ports 20 and buses 22 are based on a Multi-level Analog Signaling (MAS) technique, in particular a PAM-5 technique, where every symbol transmitted contains information of at least two bits. In the preferred embodiment, in order to minimize static power consumption while making it possible to use asynchronous links for the ports 20 and buses 22, one of the five amplitude levels of the PAM-5 waveform is used as a strobe signal to generate a change in the waveform that makes it possible for the receiving circuitry in a port 20 to sample two consecutive symbols of the same type.

Figure 2:
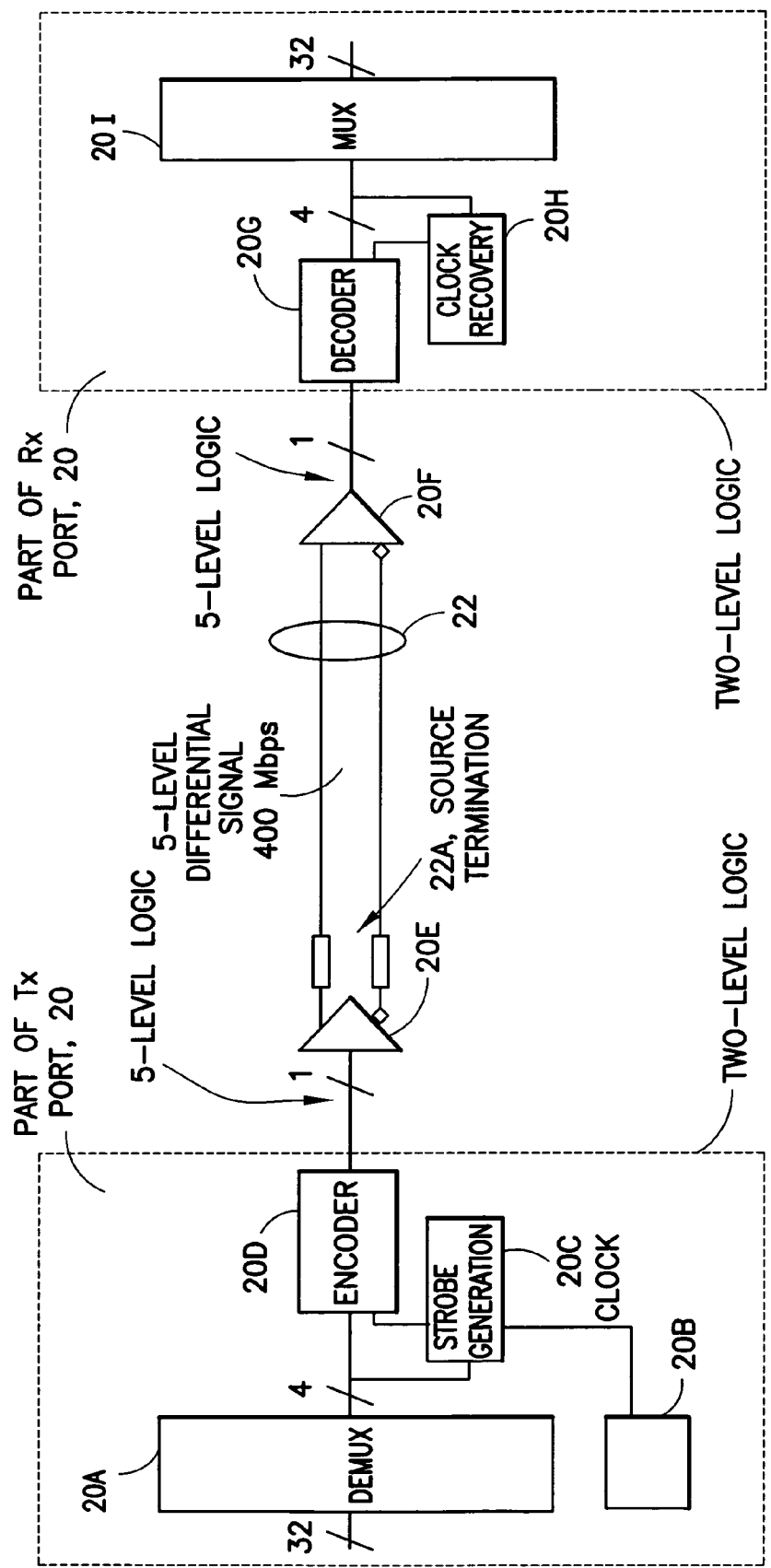
FIG. 2 shows multi-level logic in point-to-point connections.

FIG. 2 shows an embodiment of the MAS transmitter (TX) and receiver (RX) that form a part of two ports 20 connected via a bus 22 (connected in a point-to-point configuration). The TX part of a port 20 includes a demultiplexer (DEMUX) 20A (e.g., a 32-line to 4-line DEMUX), a clock generator 20B, a strobe generator 20C and an encoder 20D. The output of the encoder 20D is five-level logic (that includes the strobe level in accordance with this invention). The output of the encoder 20D is applied to a multi-level transmitter circuit 20E (see FIG. 6 for one suitable example) for transmission, through source terminations 22A, to the bus 22. The transmitted signal may take the form of a five-level differential signal that conveys data at a rate of 400 Mbps (million bits per second). The transmitted differential signal is received by a multi-level receiver comparator circuit 20F (see FIG. 7 for one suitable example). The output of the receiver circuit 20F is applied to a corresponding decoder 20G, clock recovery circuit 20H and a multiplexer (MUX) 20I, such as a 4-line to 32-line MUX or serial-to-parallel converter (see FIG. 9).

Figure 3A:
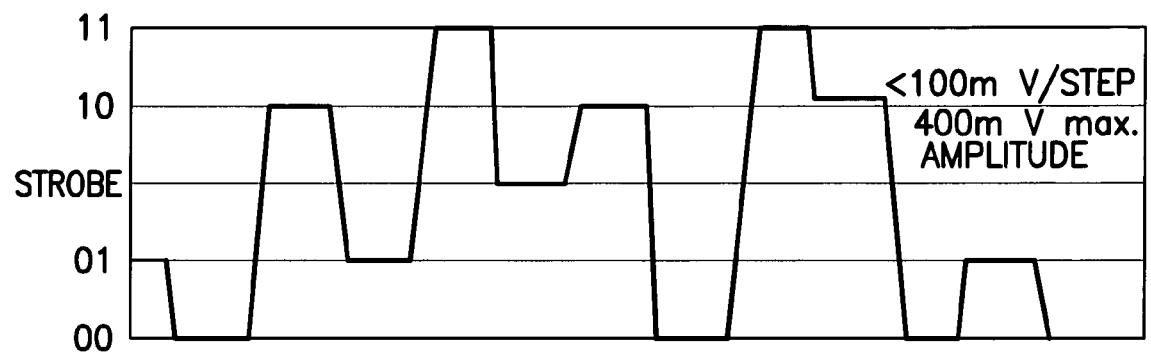
FIGS. 3A–3C, collectively referred to as FIG. 3, show a waveform diagram example of 4-level logic with one additional strobe level (FIG. 3A), and the strobe signal for 100 mV signal amplitude (FIG. 3B) and 200 mV signal amplitude (FIG. 3C)
Figure 3B:
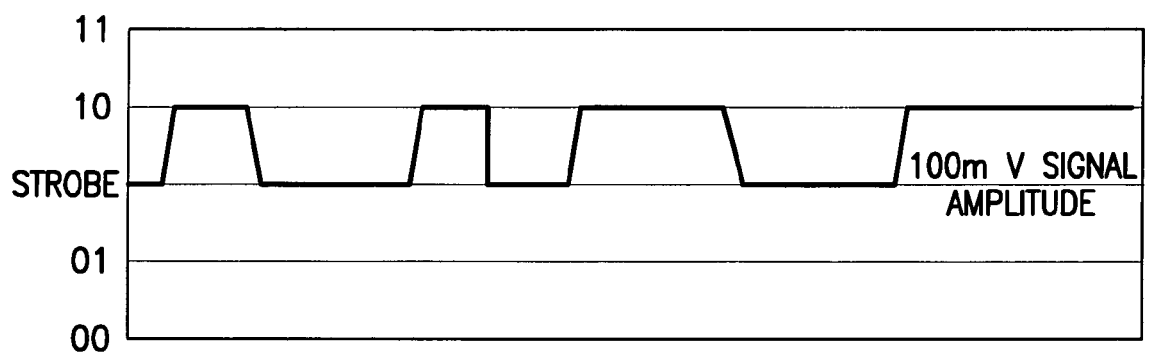
Figure 3C:
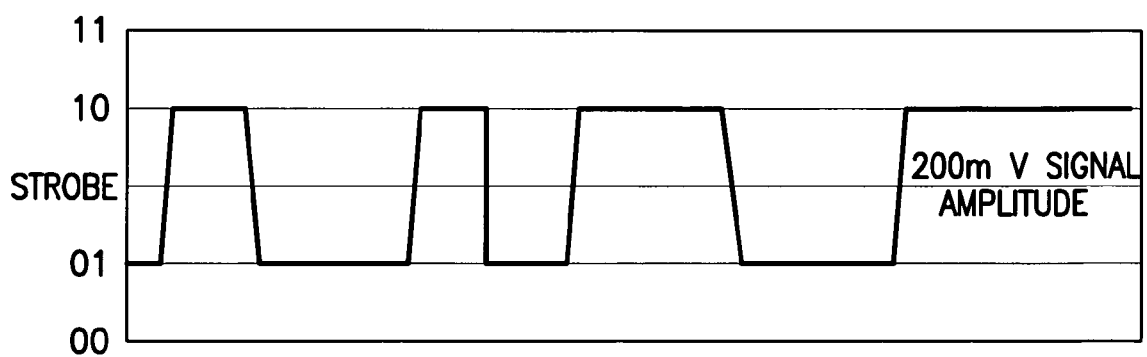
Figure 8:
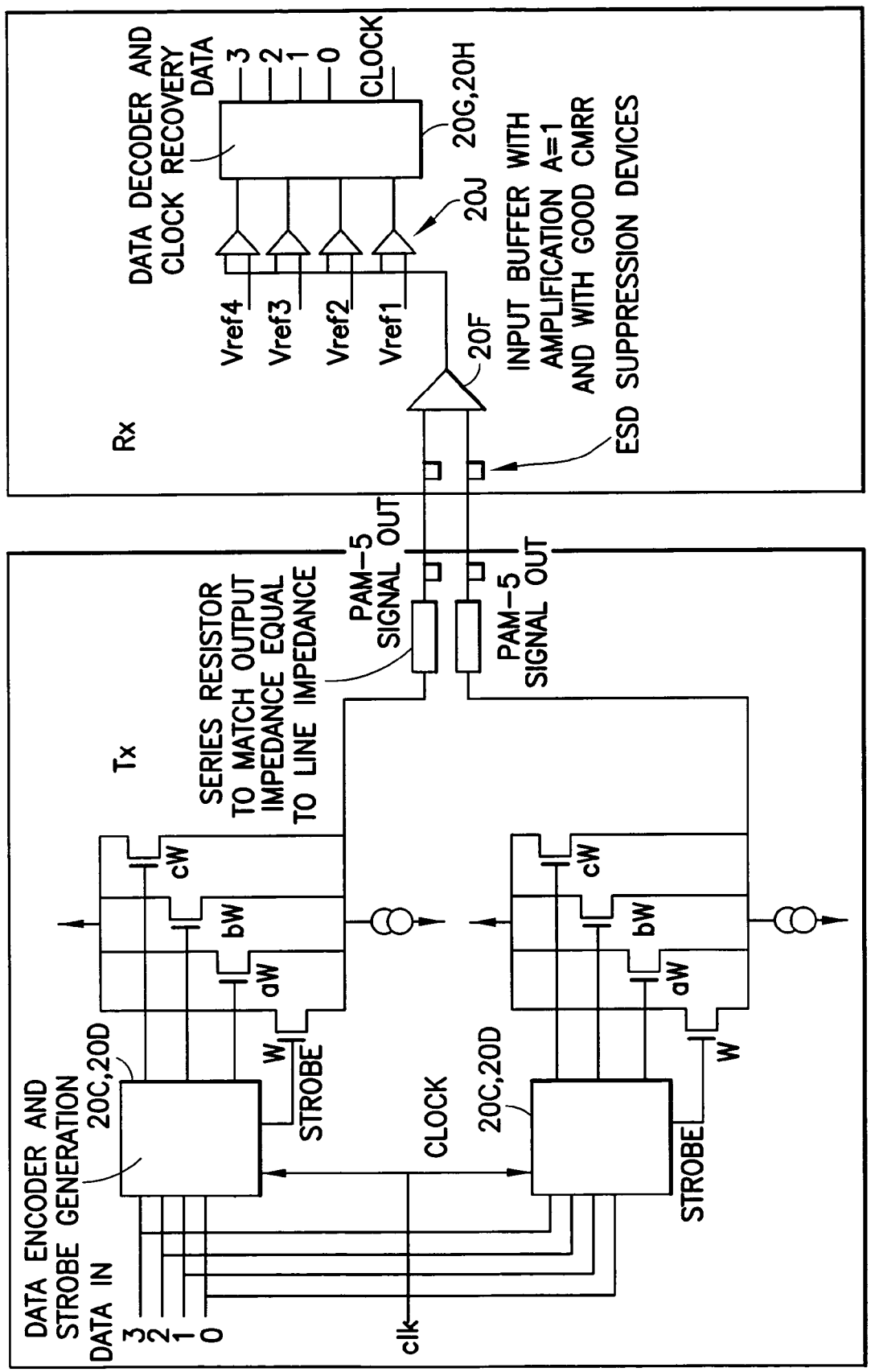
FIG. 8 is a block diagram that shows the circuitry of FIG. 2 in greater detail.

FIG. 8 shows in further detail how the differential PAM-5 signal of FIGS. 3A–3C is generated and transmitted, and how the received multi-level signal is converted to parallel data using a plurality of voltage reference levels (Vref1–Vref4).

FIG. 3A shows an example, in accordance with an embodiment of this invention, of 4-level logic with one additional strobe level used for indicating periods when consecutive data is unchanged. The transmitted bandwidth, as compared to 2-level binary logic, is log(4)/log(2)=2. At the receiver circuitry 20G, 20H the rising and falling edges are used to sample the data bits output from the receiver circuit 20F, and the strobe-level implies the presence of repeated data (where there would not normally be a rising or falling edge present in the PAM-5 waveform).

If the interface is used with some standard two-level logic system, only some of the levels are used.

Figure 4:
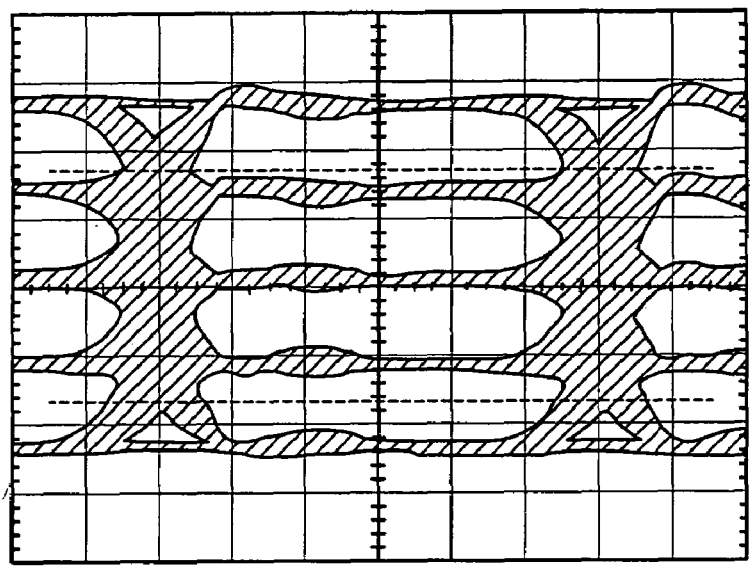
FIG. 4 shows a conventional PAM-5 eye diagram, (667 MHz, 1.5 GBaud)
Figure 5:
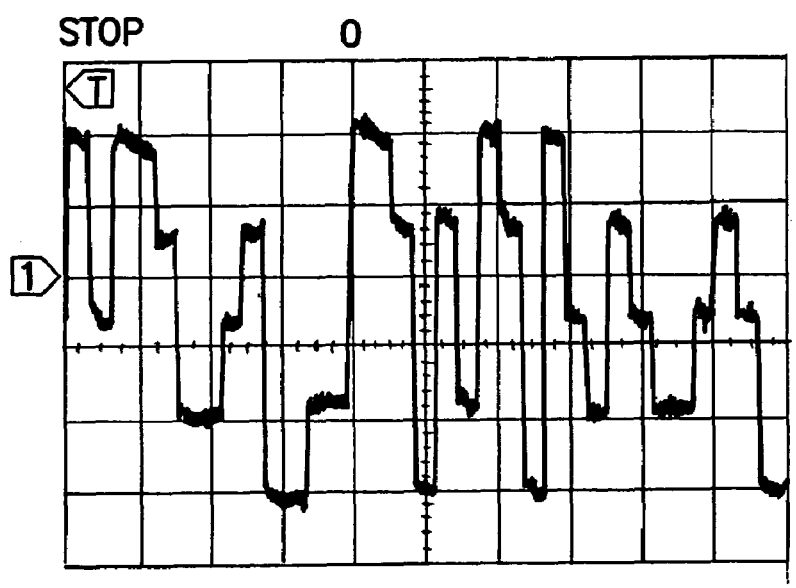
FIG. 5 shows a conventional PAM-5 signal appearance example (30 MHz, 60 MBaud)

FIGS. 4 and 5 illustrate exemplary PAM-5 signals, as can be found in "Multi-Level Analog Signaling Techniques for 10 Gigabit Ethernet", IEEE 802.3 Tutorial (http://grouper.ieee.org/groups), where FIG. 4 shows a PAM-5 eye diagram, (667 MHz, 1.5 GBaud), and FIG. 5 shows a PAM-5 signal appearance example (30 MHz, 60 MBaud).

In the preferred embodiment of this invention, the data encoder 20D and strobe generator 20C cooperate to provide clocking via the strobe signal only if there is no change in any data bits to be transmitted. The benefits of this approach include the ability to use multi-level signaling, which is known to provide high bandwidth, and to be scalable up or down by the number of amplitude levels. By the use of the encoder 20D creating a level change also when the data to be transmitted remains the same, there need be no or minimal idle power consumption in the receiver circuits, only one signal line (or a pair of differential lines) per direction is needed (i.e., a separate clock line is not required), and the clock frequency can be as low as zero Hz.

Figure 6:
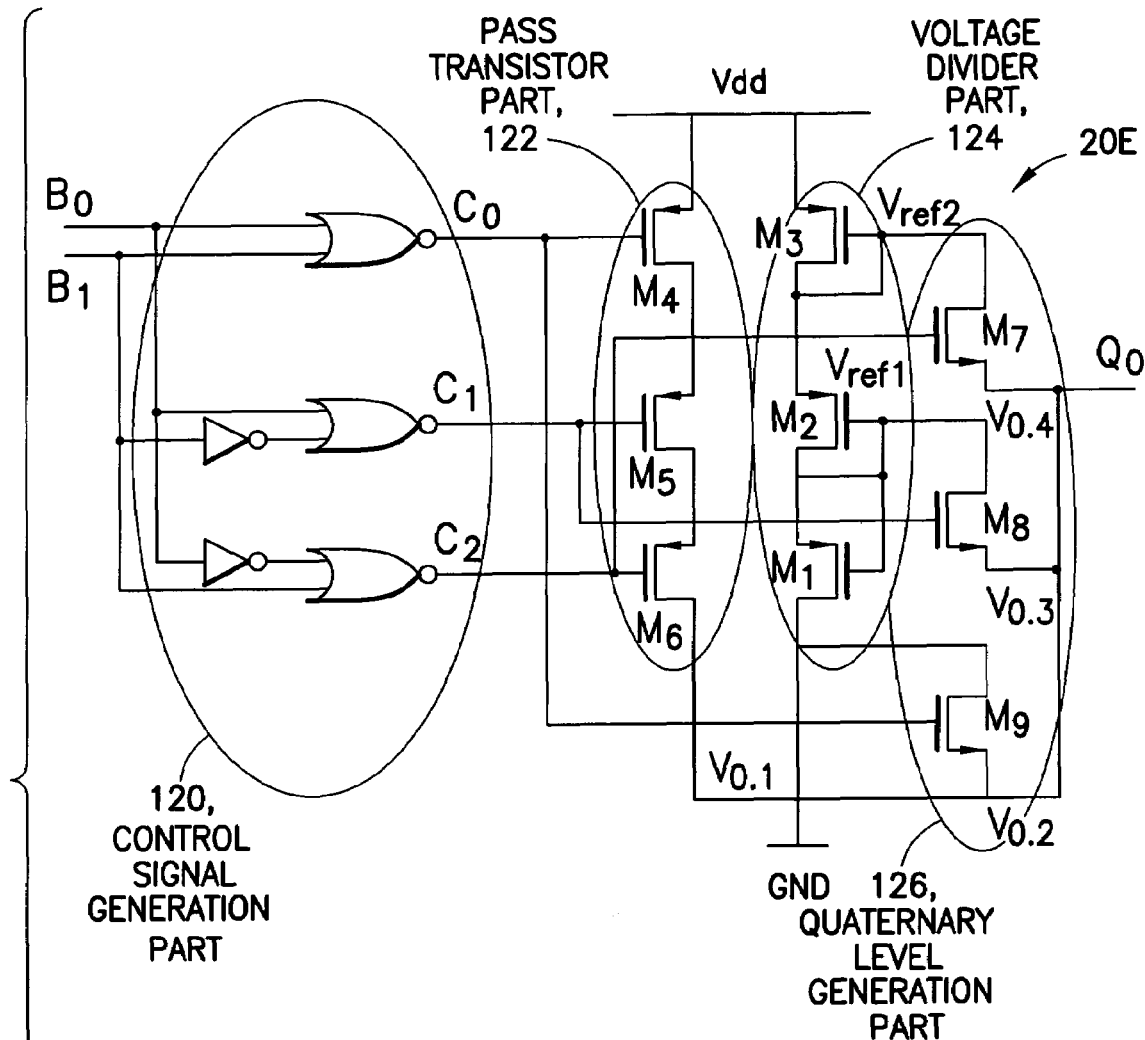
FIG. 6 is a schematic diagram of an example of a conventional multi-level transmitter that implements a binary to quaternary encoder (BQE)

FIG. 6 is a schematic diagram of a suitable embodiment for the multi-level transmitter 20E, in this case one that implements a binary to quaternary encoder (BQE), such as one disclosed in "A Current-Mode Folding/Interpolating CMOS Analog to Quaternary Converter Using Binary to Quaternary Encoding Block", S. I. Han et al., Proceedings of the 32$^{nd}$ IEEE International Symposium on Multi-Valued Logic, 2002 (ISMVL'02). The basic BQE cell includes four primary sections, a control signal generation section 120, a pass transistor section 122, a voltage divider section 124 and a quaternary level generation section 126. The Table shows the various states of the binary inputs $B_0$, $B_1$ and the resulting control signals $C_0$, $C_1$, $C_2$, and the output signal $Q_0$. Four such basic BQE cells may be grouped together for providing a four digit quaternary output (see FIG. 1 of the S. I. Han et al. publication).

Figure 7:
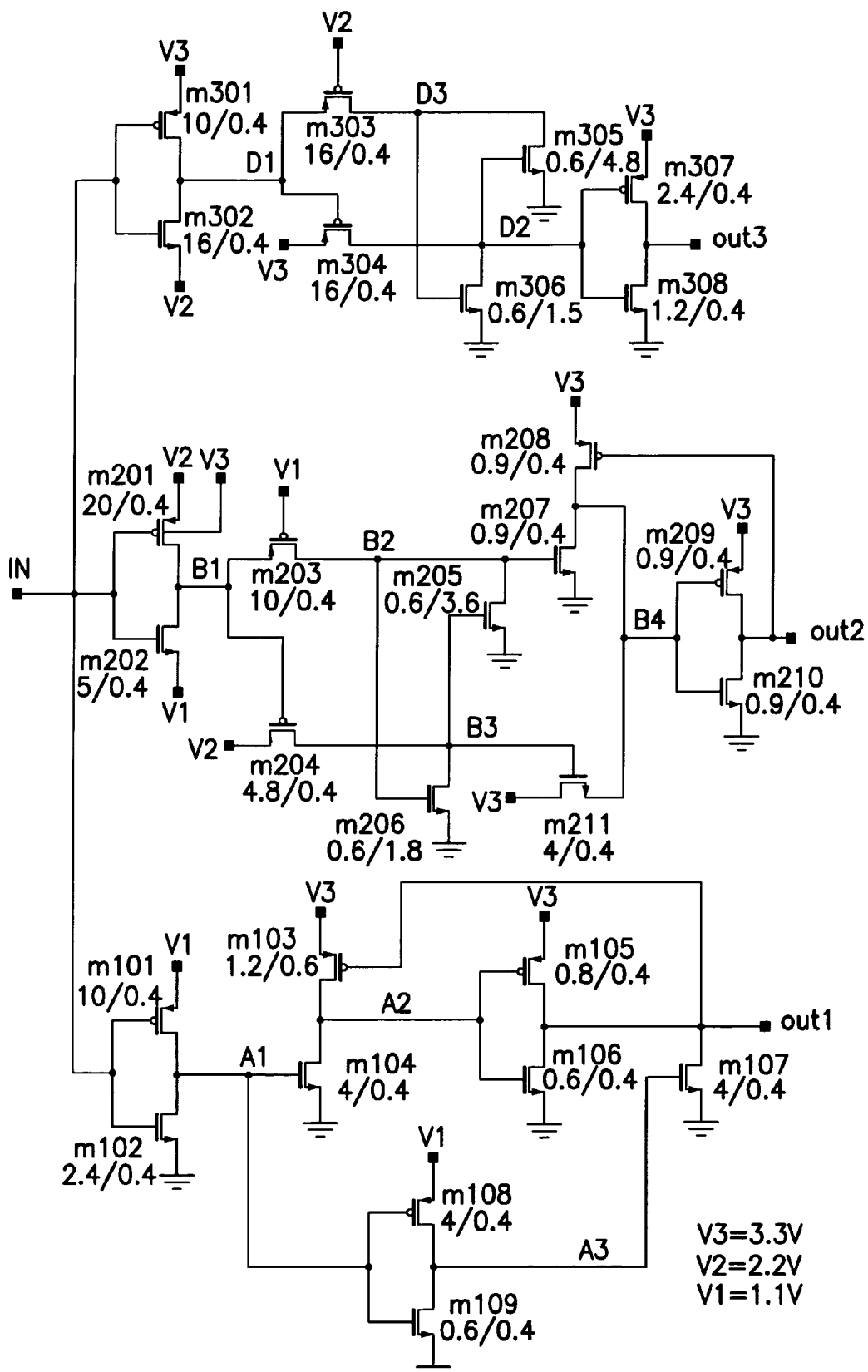
FIG. 7 is a schematic diagram of an example of a conventional multi-level receiver comparator for four-level logic.

FIG. 7 is a schematic diagram of an example of the multi-level receiver circuitry 20F, for four-level logic, such as one described in "Voltage Comparator Circuits for Multiple-Valued CMOS Logic", Y. B. Guo et al., Proceedings of the 32$^{nd}$ IEEE International Symposium on Multi-Valued Logic, 2002 (ISMVL'02).

The prior art circuits shown in FIGS. 6 and 7 are merely exemplary of circuitry that can be used to implement this invention, and the teachings of this invention are certainly not to be construed as being limited to only these particular circuits.

Figure 9:
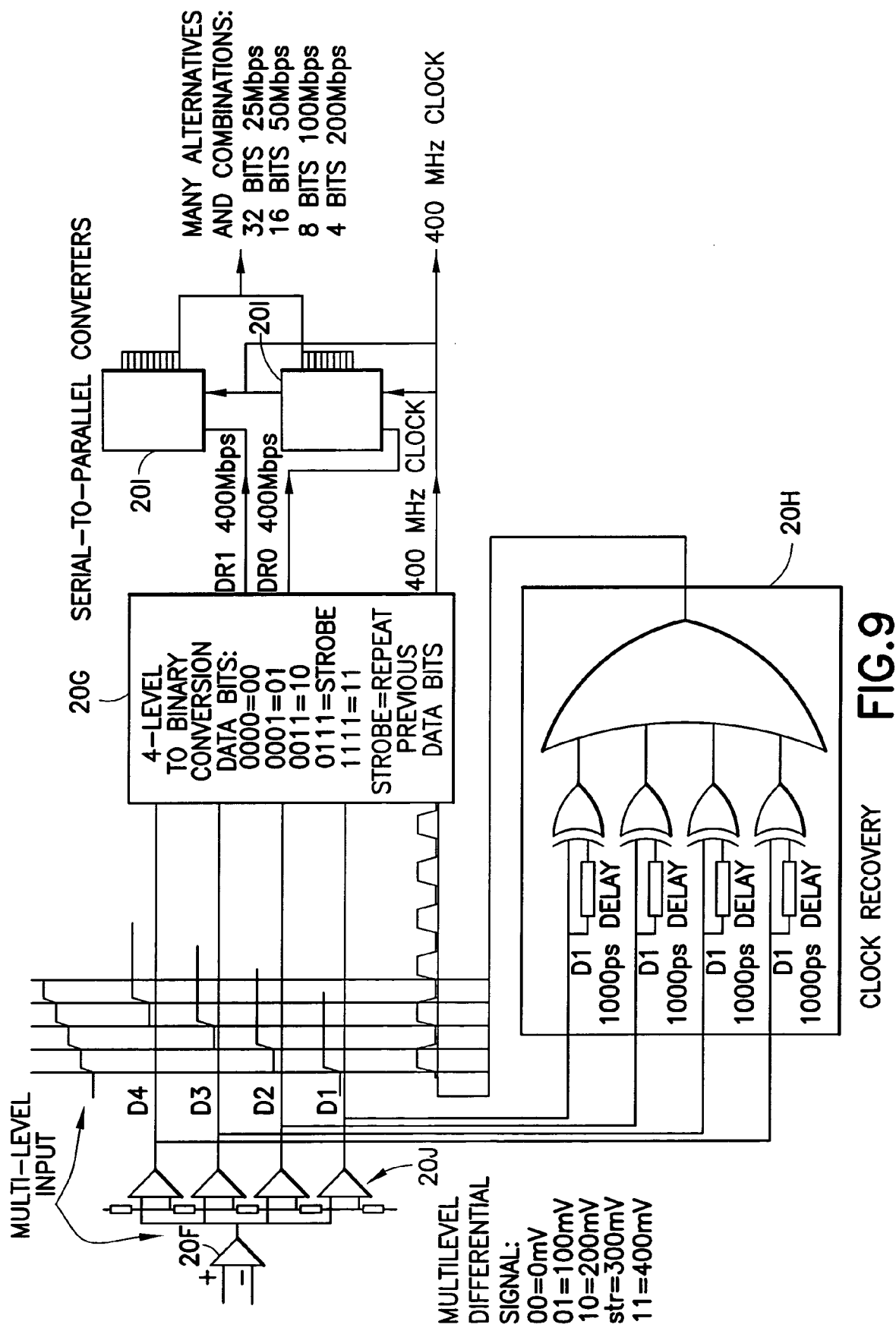
FIG. 9 is a block diagram that conceptually depicts the PAM-5 encoding (decoding) principle, with the use of the strobe signal level in accordance with this invention.

FIG. 9 shows in further detail the PAM-5 encoding principle. The receiver buffer amplifier 20F can be a low capacitance differential input buffer having a reasonable common mode rejection ratio (CMRR) and high speed differential signal ESD protection. The signal levels that appear after the input buffer amplifier 20F are selected so as to minimize the total power consumption. For example, larger signals generally mean less comparator 20J power consumption. The signal levels may be, for example, 0 mV, 200 mV, 400 mV, 600 mV and 800 mV, and the comparator 20J threshold voltages Vref1–Vref2 (FIG. 8) may then be 100 mV, 300 mV, 500 mV and 700 mV, respectively. The receiver buffer amplifier 20F, if used, may have an amplification factor that is greater than or less than unity, for optimizing power consumption, noise rejection and timing accuracy. The comparators 20J may be differential comparators that do not require the use of the amplifier 20F. The multi-level differential signal can be arranged such that the bit sequences 00, 01, 10, 11 and the strobe are encoded as follows: 00=0 mV; 01=100 mV; 10=200 mV; strobe=300 mV; and 11=400 mV. The input voltage comparators 20J (see also FIG. 8) provide output signals D–D4 to the data decoder 20G and clock recovery block 20H. Note that the clock recovery block 20H outputs a clock edge for every data transition, and that the encoding of the strobe signal level for the case of repeated data ensures that a clock edge is also generated for this case, and without requiring that a clock oscillator or PLL be included at the MAS receiver. The data decoder 20G decodes or maps D–D4 to the following data bit combinations: 0000=01; 0001=01; 0011=10; 0111=strobe; and 1111=11. When the strobe sequence is decoded, the decoder 20G repeats the previous two data bits. For example, if one assumes the received D–D4 sequence: 0000, 0011, 0111,1111, the resulting output data bits are: 01;10;10;11. Note the repeat of the bit pair '10' that is indicated by the presence of the strobe sequence 0111. If there are several repeated symbols, then the waveform toggles between the correct data level and the strobe level.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. As but some examples, other numbers of analog levels (i.e., other than PAM-5) can be used, and different data encoding/decoding mappings may be attempted by those skilled in the art. However, all such and similar modifications of the teachings of this invention will still fall within the scope of this invention.

Further, while the method and apparatus described herein are provided with a certain degree of specificity, the present invention could be implemented with either greater or lesser specificity, depending on the needs of the user.

Further still, some of the features of the present invention could be used to advantage without the corresponding use of other features. As such, the foregoing description should be considered as merely illustrative of the principles of the present invention, and not in limitation thereof.

What is claimed is:

1. A Multi-level Analog Signaling (MAS) method where each transmitted symbol encodes at least two data bits, comprising encoding data bits into symbols represented by multi-level analog signals; and, when the data bits to be encoded are the same as the data bits encoded for an immediately prior symbol, encoding instead a strobe signal represented by a predetermined one of the levels of the multi-level analog signal, where the presence of the strobe signal at a receiver is used to generate clock edges.

2. A method as in claim 1, where the multi-level analog signal comprises a PAM-5 signal, where four analog signal levels convey the encoded data bits and one analog signal level conveys the strobe signal.

3. A method as in claim 1, where for a case where there are more than two consecutive repeats of the at least two data bits, further comprising alternating between outputting a predetermined one of the levels of the multi-level analog signal that represents the corresponding symbol, and the predetermined one of the levels of the multi-level analog signal that represents the strobe signal.

4. A Multi-level Analog Signaling (MAS) circuit arrangement where each transmitted symbol encodes at least two data bits, comprising: an encoder for encoding data bits into symbols represented by multi-level analog signals, said encoder being responsive to a condition wherein the data bits to be encoded are the same as the data bits encoded for an immediately prior symbol, for encoding instead a strobe signal represented by a predetermined one of the levels of the multi-level analog signal, where the presence of the strobe signal at a receiver is used to generate clock edges for sampling the received signal.

5. A MAS circuit arrangement as in claim 4, where the multi-level analog signal comprises a PAM-5 signal, where four analog signal levels convey the encoded data bits and one analog signal level conveys the strobe signal.

6. A MAS circuit arrangement as in claim 4, where said encoder is further responsive to a condition where there are more than two consecutive repeats of the at least two data bits, for alternating between outputting a predetermined one of the levels of the multi-level analog signal that represents the corresponding symbol, and the predetermined one of the levels of the multi-level analog signal that represents the strobe signal.

7. A Multi-level Analog Signaling (MAS) circuit arrangement where each received symbol encodes at least two data bits, comprising: a decoder and clock recovery circuit for decoding received symbols represented by multi-level analog signals into data bits, said decoder and clock recovery circuit being responsive to a receipt of a strobe signal, represented by a predetermined one of the levels of the multi-level analog signal condition, for generating sampling clock edge transitions and data bits that are the same as the data bits decoded for an immediately prior received symbol.

8. A MAS circuit arrangement as in claim 7, where the multi-level analog signal comprises a PAM-5 signal, where four analog signal levels convey encoded data bits and one analog signal level conveys the strobe signal.

9. A MAS circuit arrangement as in claim 7, where said decoder and clock recovery circuit are further responsive to a receipt of alternating occurrences of a predetermined one of the levels of the multi-level analog signal that represents a corresponding symbol, and the predetermined one of the levels of the multi-level analog signal that represents the strobe signal, for generating sampling clock edge transitions and multiple instances of the same data bits.

10. A mobile station comprising a plurality of sub-assemblies coupled together by a plurality of data communication buses connected to ports, where at least one port comprises a Multi-level Analog Signaling (MAS) transmitter circuit arrangement where each transmitted symbol encodes at least two data bits, comprising: an encoder for encoding data bits into symbols represented by multi-level analog signals, said encoder being responsive to a condition wherein the data bits to be encoded are the same as the data bits encoded for an immediately prior symbol, for encoding instead a strobe signal represented by a predetermined one of the levels of the multi-level analog signal, and where at least one port comprises a MAS receiver circuit arrangement comprising a decoder and clock recovery circuit for decoding received symbols represented by the multi-level analog signals into data bits, said decoder and clock recovery circuit being responsive to a receipt of the strobe signal for generating sampling clock edge transitions and data bits that are the same as the data bits decoded for an immediately prior received symbol.

11. A mobile station as in claim 10, where the multi-level analog signal comprises a PAM-5 signal, where four analog signal levels convey the encoded data bits and one analog signal level conveys the strobe signal.

12. A mobile station as in claim 10, where for a case where there are more than two consecutive repeats of the at least two data bits, the encoder toggles between outputting a predetermined one of the levels of the multi-level analog signal that represents the corresponding symbol, and the predetermined one of the levels of the multi-level analog signal that represents the strobe signal.

13. A mobile station as in claim 10, where one of the sub-assemblies comprises a cellular engine.

14. A mobile station as in claim 13, where another one of the sub-assemblies comprises a display.

15. A mobile station as in claim 13, where another one of the sub-assemblies comprises a camera.

16. A mobile station as in claim 13, where said cellular engine is coupled to circuitry external to said mobile station via another port and bus.

* * * * *